United States Patent
Chishima et al.

(10) Patent No.: US 7,382,246 B2
(45) Date of Patent: Jun. 3, 2008

(54) TRANSMISSION CONTROL DEVICE

(75) Inventors: Makoto Chishima, Kanagawa (JP);
Kugo Morita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 199 days.

(21) Appl. No.: 11/259,637

(22) Filed: Oct. 25, 2005

(65) Prior Publication Data

US 2006/0097887 A1 May 11, 2006

(30) Foreign Application Priority Data

Oct. 26, 2004 (JP) ............... P.2004-311293

(51) Int. Cl.
*G08B 1/08* (2006.01)

(52) U.S. Cl. .................. 340/539.1; 340/572.1; 340/539.11

(58) Field of Classification Search .......... 340/539.1, 340/572.1, 571, 572.8, 539.13, 568.1, 539.11
See application file for complete search history.

(56) References Cited

U.S. PATENT DOCUMENTS

| | | | |
|---|---|---|---|
| 6,853,345 B2* | 2/2005 | King et al. ............ | 343/795 |
| 2003/0158857 A1 | 8/2003 | Weng et al. | |

FOREIGN PATENT DOCUMENTS

| | | |
|---|---|---|
| JP | 2003-325074 | 11/2003 |
| WO | 02/095671 | 11/2002 |
| WO | 02/095675 | 11/2002 |
| WO | 03/061366 | 7/2003 |
| WO | 2004/079644 | 9/2004 |

* cited by examiner

*Primary Examiner*—Daryl C Pope
(74) *Attorney, Agent, or Firm*—Hogan & Hartson LLP

(57) ABSTRACT

A transmission control device is attached to a package containing contents which have individual wireless transmitting devices for transmitting identifiable information. The transmission control device detects whether the package is opened, and invalidates the identifiable information when the opening of the package is not detected.

4 Claims, 3 Drawing Sheets

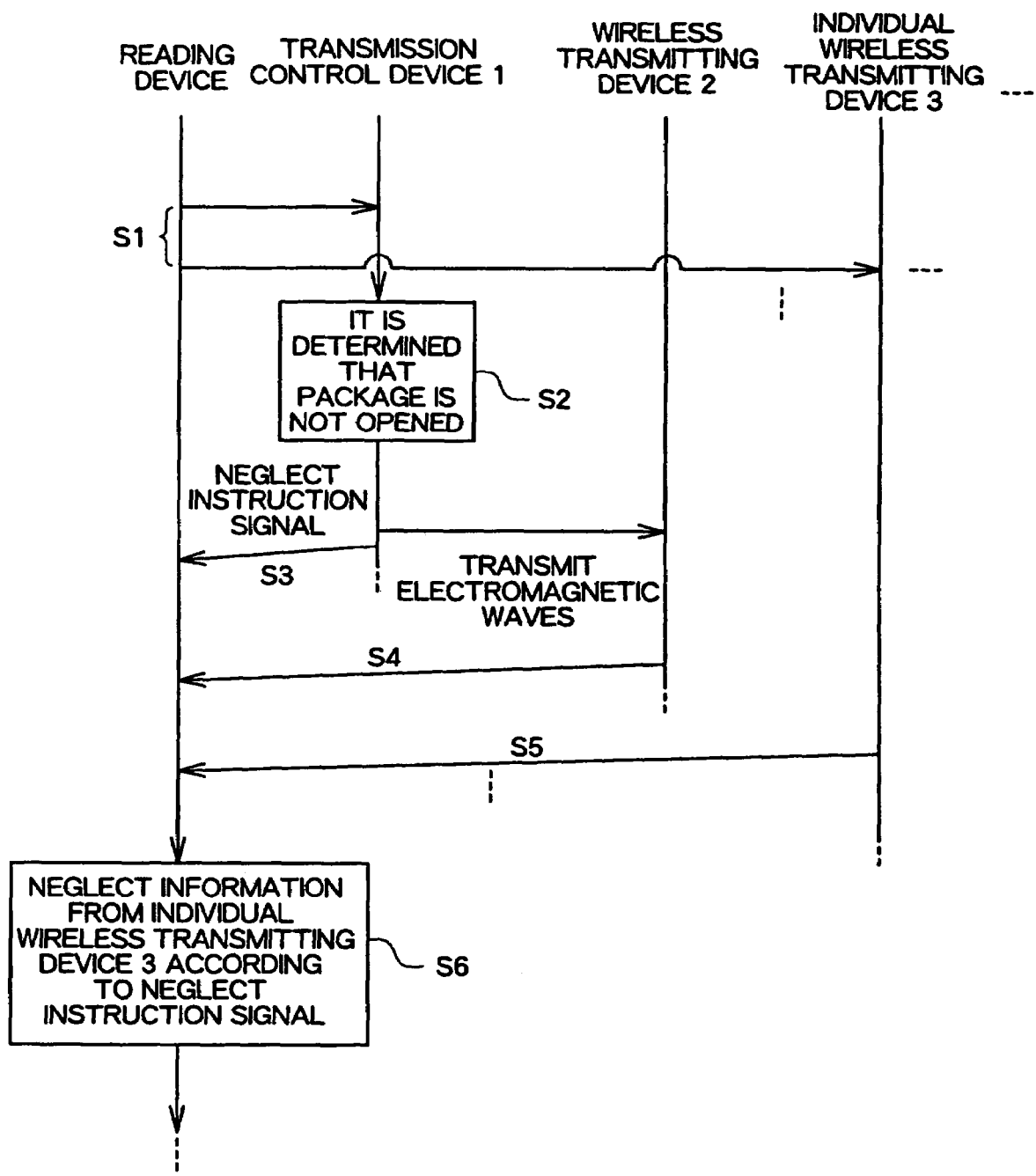

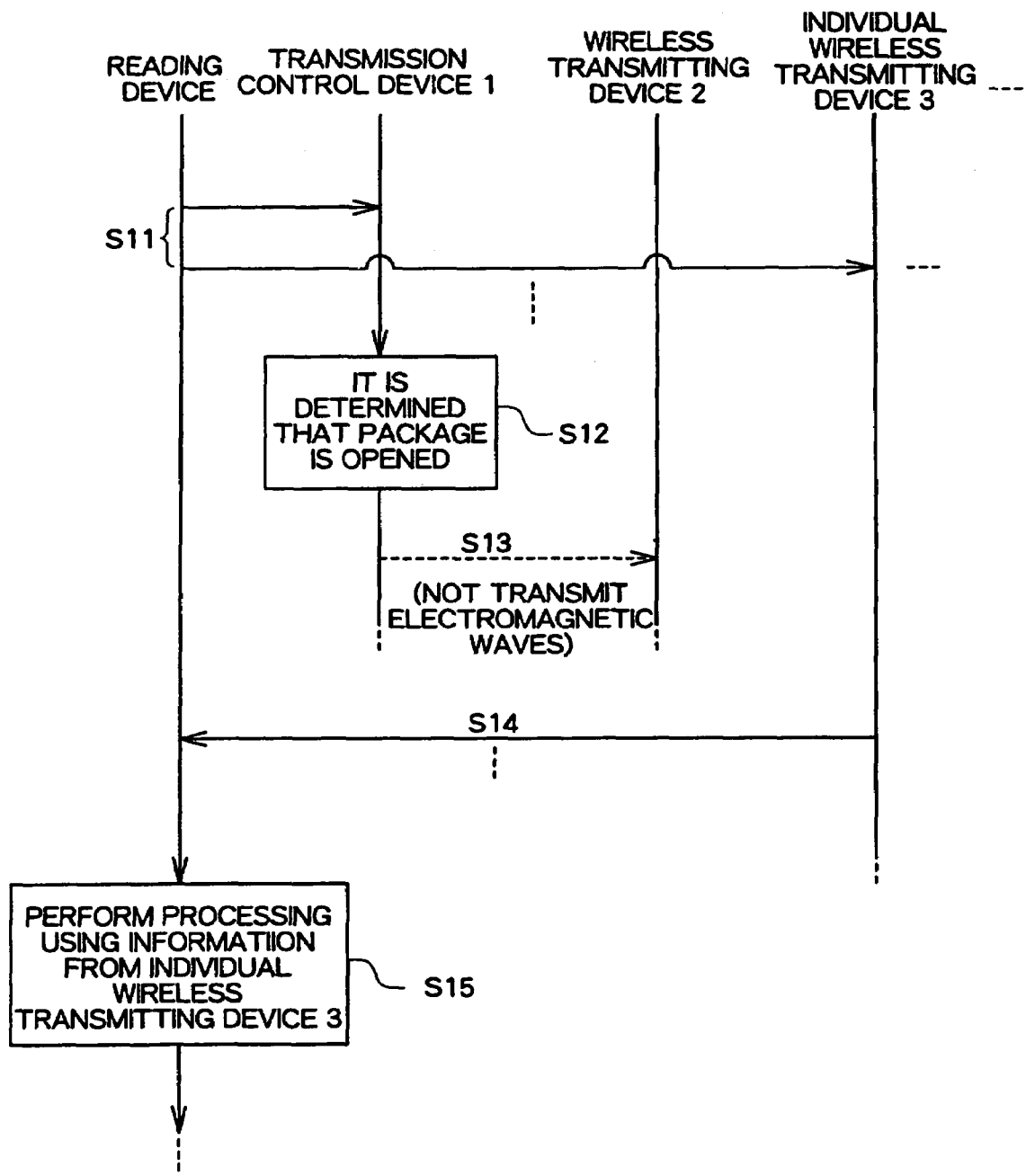

TRANSMISSION CONTROL DEVICE

CROSS-REFERENCE TO RELATED APPLICATIONS

The priority application Number JP 2004-311293 upon which this patent application is based is hereby incorporated by reference.

BACKGROUND OF THE INVENTION

1. Field of the Invention

The present invention relates to a transmission control device which is attached to, for example, packaged foods.

2. Description of the Related Art

In recent years, code images, such as a bar code, have come into widespread use for managing goods. However, in this case, it is necessary to confirm the attachment position of the bar code in order to read it, which deteriorates usability.

Therefore, in order to improve the usability, a method of processing, for example, merchandise management information by a wireless communication technique using a wireless transmitting device, such as a so-called RFID tag, has been studied. When the RFID tag and household appliances having information processing devices integrated there into are spread, in the near future, the following technique will be realized: the RFID tags are attached to articles of food stored in a refrigerator, information of the RFID tag is read out, and the read information is transmitted to, for example, a mobile phone through a network. For example, JP-A-2003-325074 discloses a system for managing unique information of eggs contained in a package.

However, in actual merchandise management, it is preferable to separately discriminate individual goods, and a plurality of individual goods may be contained in a package (a package of goods).

When the package containing individual goods is opened, all contents contained in the package may be used at the same time, or some of them may be used. However, in the case in which some of the contents are used, a technique for managing the remaining contents using RFID has not been considered yet.

SUMMARY OF THE INVENTION

Therefore, the invention is designed taking the above-mentioned circumstances into consideration, and it is an object of the invention to provide a transmission control device capable of performing information transmission control on a package containing contents individually packed.

According to an aspect of the invention, a transmission control device is attached to a package containing contents which have individual wireless transmitting devices for transmitting identifiable information. The transmission control device includes a detecting unit that detects whether the package is opened, and invalidates the identifiable information until it is detected that the package is opened.

BRIEF DESCRIPTION-OF THE DRAWINGS

The invention will be described with reference to the accompanying drawings, wherein like numbers reference like elements.

FIG. 3 is a flow chart illustrating an example of the operation of the transmission control device according to the embodiment of the invention.

FIG. 4 is a flow chart illustrating another example of the operation of the transmission control device according to the embodiment of the invention.

DESCRIPTION OF THE PREFERRED EMBODIMENT

Figure 1:
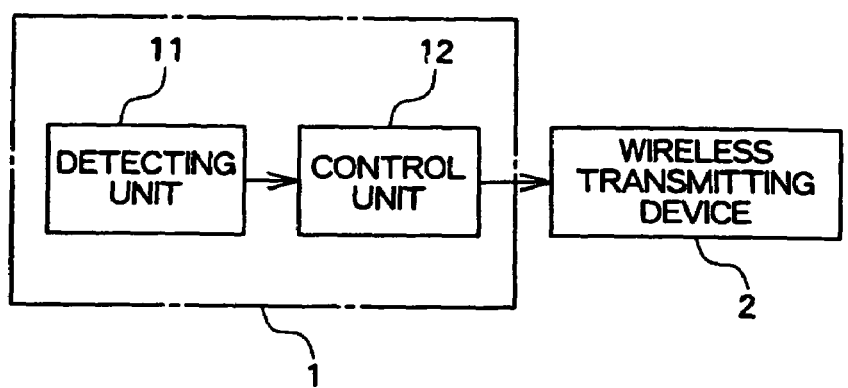
FIG. 1 is a block diagram illustrating a transmission control device and a connection structure thereof according to an embodiment of the invention.

A preferred embodiment of the invention will be described with reference to the accompanying drawings. A transmission control device 1 according to an embodiment of the invention is attached to a package E having contents C individually packed therein, and is connected to a wireless transmitting device 2 for transmitting predetermined general information, as shown in FIG. 1. The transmission control device 1 includes a detecting unit 11 and a control unit 12. The contents C in the package E are individually packed, and an individual wireless transmitting device 3 for transmitting predetermined identifiable information is attached to a packing of each content C (see FIG. 2).

The wireless transmitting device 2 receives electromagnetic waves transmitted from the outside (a reading device) to be powered, and to transmit wireless signals indicating predetermined general information. The general information is all information items related to the contents C, such as the total number of contents C and an information item on the expiration date of the contents before opening.

The individual wireless transmitting device 3 receives electromagnetic waves transmitted from the outside (the reading device) to be powered, and to transmit wireless signals indicating predetermined identifiable information. The identifiable information is information on an individual content C, such an information item on the expiration date of the content C after opening.

Figure 2:
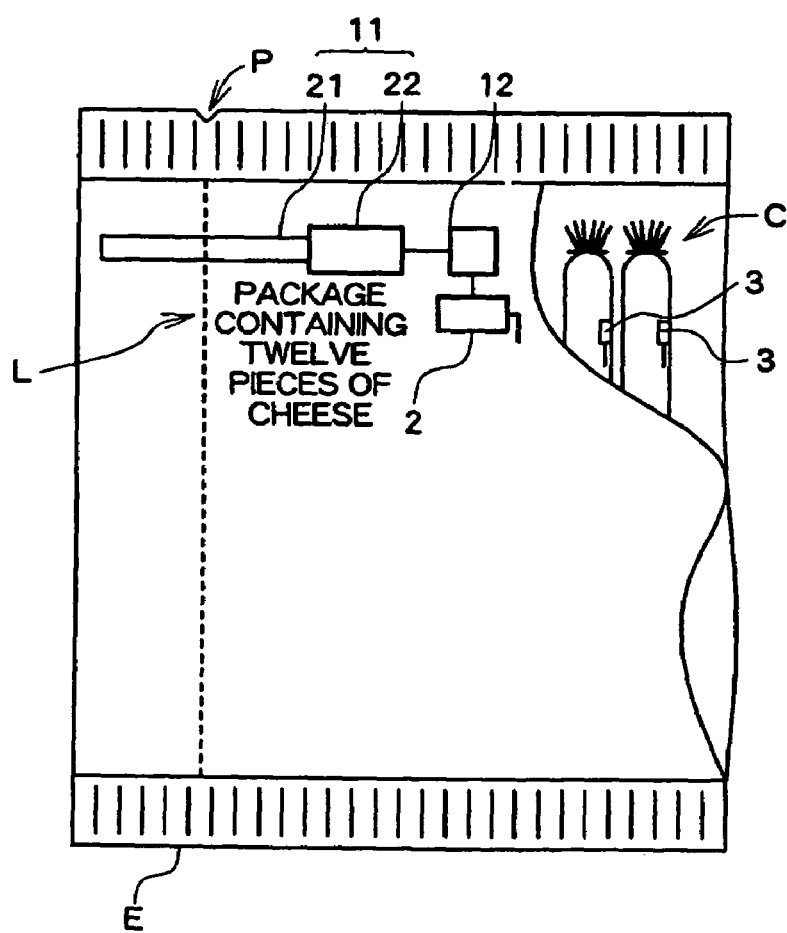
FIG. 2 is a diagram illustrating an example of a package.

As shown in FIG. 2, the package E includes a portion P on which a process for easy opening, such as a notch process or a microsectioning process, is performed in an outer circumferential portion, and an opening line L (a package opening line). That is, a consumer cuts the package E along the opening line to take the contents out. FIG. 2 shows the package E with a portion thereof virtually cut, in order to illustrate the inner of the package, but the cut state differs from a cut state at the time of opening.

The transmission control device 1 receives electromagnetic waves from the outside (the reading device) to be powered and performs the following operations.

The detecting unit 11 includes a line 21 (electrical line) arranged at a position crossing the opening line L and a detecting circuit 22 for detecting the breaking of the electrical line 21. The electrical line 21 is formed by, for example, attaching a conductive pattern on the surface (the inner surface or the outer surface) of the package E. When the transmission control device 1 receives electromagnetic waves and is powered, the detecting circuit 22 detects whether the electrical line 21 is broken. When it is determined that the electrical line 21 is broken, the detecting circuit 22 transmits the fact to the control unit 12. A general breaking detecting circuit can be used as the detecting circuit 22.

The control unit 12 manages information indicating whether the package E is opened. More specifically, when the transmission control device 1 receives electromagnetic waves and is powered, the control unit 12 determines that the package E is not open during the period in which the detecting circuit 22 does not output the signal indicating the breaking of the electrical line. When the detecting circuit 22 outputs the signal indicating the breaking of the electrical line, the control unit 12 determines that the package E is opened.

When the package E is not open, the control unit 12 performs an invalid control process for invalidating the identifiable information transmitted by the individual wireless transmitting device 3 attached to the content C according to the result of determination.

The invalid control process is performed by the following methods: (1) a method of controlling the individual wireless transmitting device 3 to stop transmitting signals; and (2) a method of instructing the device (the reading device) receiving the signals transmitted from the individual wireless transmitting device 3 to neglect the signals transmitted from the individual wireless transmitting device 3. The methods will be described below. First, the method of controlling the individual wireless transmitting device 3 to stop transmitting signals will be described.

In this method, when receiving electromagnetic signals from the reading device, the individual wireless transmitting device 3 determines whether to transmit information according to the instructions received from the control unit 12. That is, when receiving the electromagnetic signals to be powered from the reading device, the control unit 12 transmits a signal instructing not to transmit information to the individual wireless transmitting device 3 during the period in which the package E is not opened. Then, the individual wireless transmitting device 3 stops transmitting signals.

Next, the method of instructing the reading device to neglect the signals transmitted from the individual wireless transmitting device 3 will be described. In this case, when receiving electromagnetic signals from the reading device to be powered, the control unit 12 transmits a signal (a neglect instruction signal) instructing to neglect the signals received from the individual wireless transmitting device 3 to the reading device during the period in which the package E is not opened. In this case, when receiving the neglect instruction signal, the reading device performs a process for neglecting the signals received from the individual wireless transmitting device 3.

In order to perform this process, the identifiable information transmitted by the individual wireless transmitting device 3 includes information on an identifier unique to the content C or each individual wireless transmitting device 3. In addition, the neglect instruction signal includes information on an identifier included in a signal to be neglected. The reading device extracts the identifier included in the neglect instruction signal and does not perform a process related to the received signal including information on the extracted identifier.

When the package E is opened, the control unit 12 stops performing an identifiable information invalidating control process, and performs a general information invalidating control process. The general information invalidating control process is performed by the following methods: (1) a method of controlling the wireless transmitting device 2 to stop transmitting signals; and (2) a method of instructing the device (the reading device) receiving the signals transmitted from the wireless transmitting device 2 to neglect the signals transmitted from the wireless transmitting device 2. This embodiment uses the method of controlling the wireless transmitting device 2 to stop transmitting signals. Specifically, the control method can be performed as follows. That is, the wireless transmitting device 2 receives electromagnetic waves to be powered from the transmission control device 1. When detecting that the package E is not opened, the transmission control device 1 transmits electromagnetic waves to power the wireless transmitting device 2. On the other hand when detecting that the package E is opened, the transmission control device 1 stops transmitting electromagnetic waves so as not to power the wireless transmitting device 2.

Next, the operation of the transmission control device according to this embodiment will be described with reference to FIGS. 3 and 4. It is assumed that individually packaged foods are encased in the package E and individual wireless transmitting devices 3 are attached to the individually packaged foods. In addition, it is assumed that an invalid control process is performed by the method of instructing the reading device to neglect the signals transmitted from the individual wireless transmitting device 3 and the reading device is integrated into a refrigerator. The reading device has the same structure as a general RFID tag reader has. However, the reading device differs from the RFID tag reader in that, when the neglect instruction signal is received, the reading device neglects information in response to the neglect instruction signal (that is, the reading device controls the information not to be used for the process).

A user keeps the package E in the refrigerator in an unopened state. It is assumed that the reading device integrated into the refrigerator radiates electromagnetic waves to power the respective units to acquire information therefrom (S1 in FIG. 3). At that time, the control unit 12 of the transmission control device 1 determines that the package E is not opened since it does not receive a signal indicating that the electrical line is broken (S2). Then, the transmission control device 1 transmits the neglect instruction signal to the reading device (S3). The neglect instruction information is information instructing the reading device to neglect identifiable information transmitted by the individual wireless transmitting device 3. The neglect instruction signal includes information on an identifier unique to the individual wireless transmitting device 3 enclosed in the package E.

The wireless transmitting device 2 receives electromagnetic waves to be powered from the transmission control device 1 and transmits predetermined general information (S4). The individual wireless transmitting device 3 receives electromagnetic waves to be powered from the reading device and transmits identifiable information (S5). The identifiable information transmitted by the individual wireless transmitting device 3 includes the information on the unique identifier.

The reading device determines which identifiable information is instructed to be ignored by the neglect instruction signal, on the basis of the information on the unique identifier included in the identifiable information received from the individual wireless transmitting device 3 (S6). Then, the reading device performs control so as not to execute the process related to the signal. Meanwhile, since the general information received from the wireless transmitting device 2 is not neglected by the neglect instruction signal, for example, the reading device performs a predetermined process, such as a process for demodulating the general information, to acquire the general information. The acquired general information is processed by a device on the refrigerator, and is then, for example, transmitted to a user's mobile phone through a network.

Next, when the user opens the package E, the electrical line 21 of the detecting unit 11 is broken. Then, the detecting circuit 22 detects the breaking of the electrical line 21 and outputs it to the control unit 12.

The reading device of the refrigerator radiates electromagnetic waves to power the respective components to acquire information (S11 of FIG. 4). At that time, the control unit 12 of the transmission control device 1 determines that the package E is opened since it receives a signal indicating that the electrical line is broken (S12). Then, the transmission control device 1 does not transmit electromagnetic waves to power the wireless transmitting device 2 (S13). In this way, the transmission of the general information by the wireless transmitting device 2 stops.

Meanwhile, the individual wireless transmitting device 3 receives electromagnetic waves to be powered from the reading device and transmits predetermined identifiable information (S14). The identifiable information transmitted by the individual wireless transmitting device 3 includes the information on the unique identifier.

The reading device determines which identifiable information is instructed not to be ignored by the neglect instruction signal, on the basis of the information on the unique identifier included in the identifiable information received from the individual wireless transmitting device 3. Then, the reading device performs a predetermined process, such as a process for demodulating the identifiable information, to acquire the identifiable information (S15). The acquired identifiable information is processed by a device on the refrigerator, and is then, for example, transmitted to a user's mobile phone through a network.

According to this embodiment, the general information transmitted by the wireless transmitting device 2 attached to the package E is selectively read out to be used until the package E is opened. After the package E is opened, the identifiable information transmitted by the individual wireless transmitting devices 3 attached to the contents C of the package E is selectively read out to be used.

That is, in the related art, when the number of contents in the refrigerator is checked, the wireless transmitting device 2 attached on the package E transmits general information indicating that the package contains twelve pieces of cheese, and twelve individual wireless transmitting devices 3 enclosed in the package E each transmit identifiable information indicating that a piece of cheese is contained. When the read information is processed, information obtained from the general information, indicating that twelve pieces of cheese are contained, and information obtained from the identifiable information, indicating twelve pieces of cheese are contained, are demodulated. As a result, it is determined that a total of twenty-four pieces of cheese is contained in the refrigerator.

In contrast, according to this embodiment, until the package is opened, the individual wireless transmitting device 3 is instructed not to transmit information, or the reading device is instructed to neglect the information from the individual wireless transmitting device 3. Therefore, only the general information from the wireless transmitting device 2, indicating that the package contains twelve pieces of cheese, is used for processing, which prevents the number of contents from being counted twice. On the other hand, after the package is opened, the wireless transmitting device 2 does not receive the general information, and only the identifiable information is used for processing, which makes it possible to count the number of the remaining contents.

Further, the information transmitted by the wireless transmitting device 2 includes information on the expiration date of contents in an unopened state, and the information transmitted by the individual wireless transmitting device 3 includes information on the expiration date of contents in an opened state. In this case, it is possible to handle, for example, a pack containing nitrogen gas as a filler which has different expiration dates in an unopened state and an opened state.

Furthermore, the detecting unit 11 is attached to the package E to detect the opening of the package, but the invention is not limited thereto. For example, the detecting units 11 may be attached to individual packs of the contents C to detect whether the individual packs are opened. In this case, the individual wireless transmitting device 3 may transmit the identifiable information including information indicating whether the individual pack is opened. In this way, the reading device can count the number of contents C in an unopened state and the number of contents C in an opened state.

While the present invention is described in terms of preferred or exemplary embodiments, it is not limited hereto.

What is claimed is:

1. A transmission control system which is attached to a package containing contents which have individual wireless transmitting devices for transmitting identifiable information including:
   a wireless transmitting device that transmits general information on all the contents; and
   a transmission control device which includes a detecting unit that detects whether the package is opened, and a controller connected to said detecting unit for invalidating said individual wireless transmitting devices until said detecting unit detects that the package is opened, and invalidating said wireless transmitting device to transmit the general information when said detecting unit detects that the package is opened.

2. The transmission control system according to claim 1, wherein the detecting unit includes:
   an electrical line that is arranged at a position crossing an opening line of the package; and
   a detecting circuit that detects the breaking of the electrical line.

3. A transmission control device which is attached to a package containing contents which have individual wireless transmitting devices for transmitting identifiable information including:
   a detecting unit for detecting whether the package is opened; and
   controller for instructing a reading device which receives signals transmitted from said individual wireless transmitting devices to neglect the signals transmitted from the individual wireless transmitting devices so that invalidate said identifiable information until said detecting unit detects that the package is opened.

4. The transmission control device according to claim 3, wherein the detecting unit includes:
   an electrical line that is arranged at a position crossing an opening line of the package; and
   a detecting circuit that detects the breaking of the electrical line.

* * * * *